April 9, 1929.   M. HEMMINGSEN   1,708,299
LOGGING DEVICE
Filed Oct. 18, 1923   2 Sheets-Sheet 1
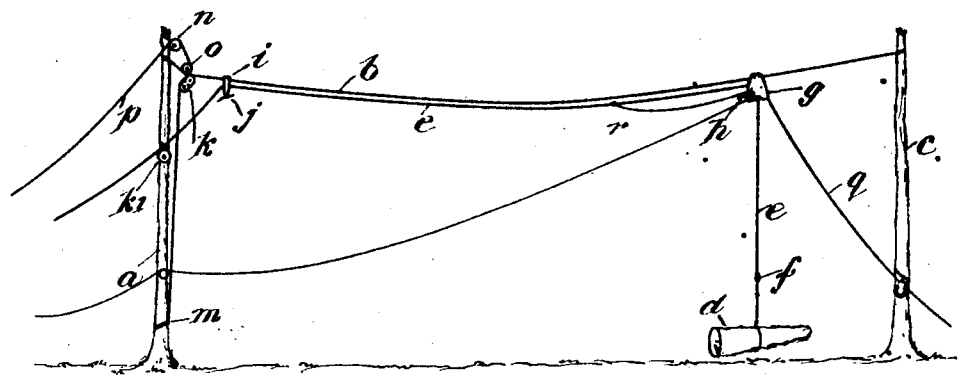
Fig. 1
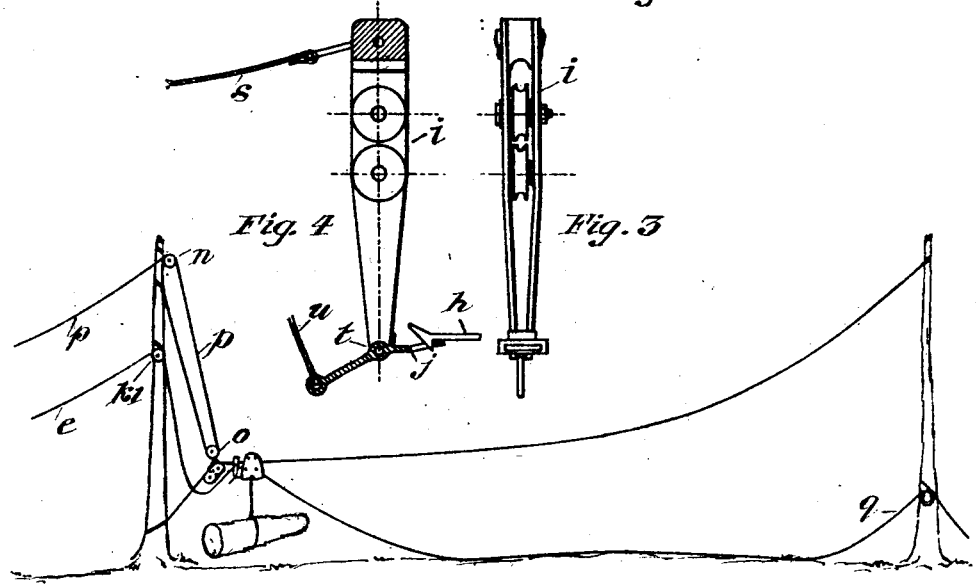
Fig. 4   Fig. 3
Fig. 2
Matthias Hemmingsen,
Inventor.
J. L. Boyden,
Attorney.

April 9, 1929.  M. HEMMINGSEN  1,708,299
LOGGING DEVICE
Filed Oct. 18, 1923   2 Sheets-Sheet 2
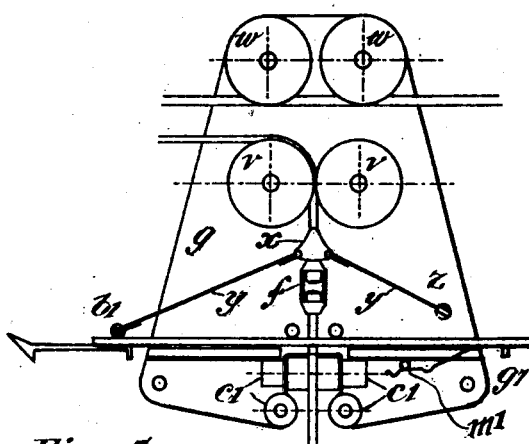
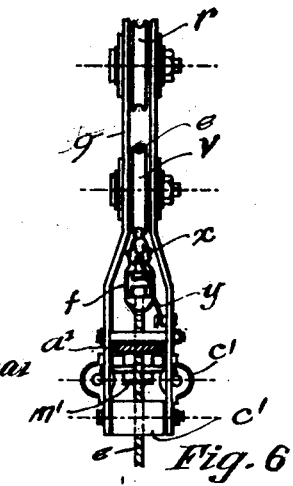
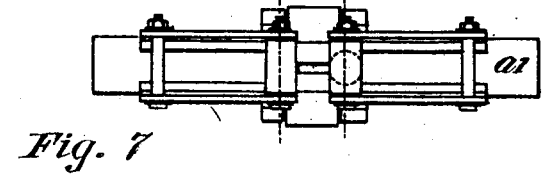
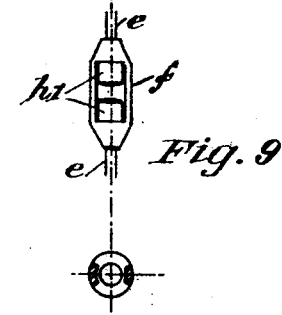
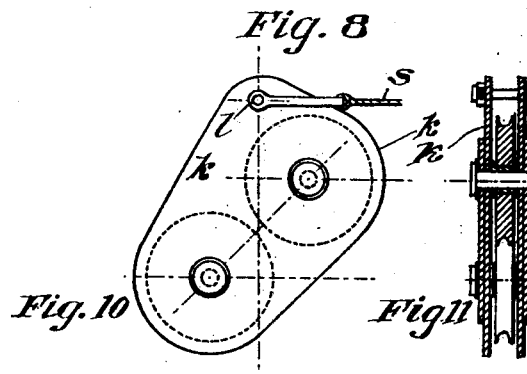
Matthias Hemmingsen.
Inventor.
D. L. Boyden.
Attorney.

Patented Apr. 9, 1929.

1,708,299

UNITED STATES PATENT OFFICE.

MATHIAS HEMMINGSEN, OF VICTORIA, BRITISH COLUMBIA, CANADA.

LOGGING DEVICE.

Application filed October 18, 1923. Serial No. 669,262.

This invention relates to the logging operation of "yarding" in which the trees immediately after felling are collected as logs to some central location in the woods for convenient shipment, first to the skidways in the forest and thence to the more highly organized methods of transportation, its main objects are to provide quicker and safer methods of handling the logs and also to promote a further efficiency owing to the more compact disposal of the logs in the particular operation named.

In my system of yarding with a "sky line" the latter—which is usually a taut cable secured firmly to the main pole and back pole at a height of say 180 feet, and is now more generally used for other purposes than yarding—is secured to the back pole at some convenient height not too great but depending on the strain of the work and the strength of the tree used for the "pole," but instead of being secured to the top of the main pole is at or about that location looped through a double pulley block of somewhat special construction and thence continued to the foot of the main pole and there secured. The above named special pulley block is so arranged that it can be vertically lowered or raised by a cable from the hauling engine over a pulley at the top of the main pole and a similar one linked to and immediately over the special double pulley block, the cable end being secured to the upper end of the main pole; by this arrangement it will be noticed that the sky line at the main pole end may be either raised or lowered, this procedure being an essential feature of the device.

Suspended from the sky line and travelling along it is an automatic cable locking compound pulley block device for the main haulage cable which consists of a steel framing carrying a double pair of sheaves or friction pulleys the lower pair of which act as a stop for the cable (which passes between them) in conjunction with a horizontal steel slide through which the cable passes, this slide has a short longitudinal traverse limited by stops and is attached to the inside of the sheave framing by a light steel cable carrying about midway of its length a linked triangular stop through which the main haulage cable passes at right angles, the main cable itself carries another stop in the form of a double ended shackle or swivel slightly tapered towards the ends, which is arranged to engage the underside of the triangular stop before named and to carry it from the upper surface of the steel slide where it normally rests until it makes contact with the adjacent undersides of the pair of pulleys which form its guide, this motion actuates the steel slide which is accordingly drawn forward into the position where it can intercept the swivel stop on the main cable thus locking or arresting it from further vertical motion; in practice with the self locking pulley block in this position the log has been lifted clear of the ground obstructions and can be rapidly hauled to the main pole or any intervening point in the usual way; a further improvement however consists in a lighter block also running on the sky line and carrying at its lower end a weighted stirrup with a loop so adjusted that the steel slide on the main pulley block before named will come into engagement with it at any desired point—say near the main pole—the function of this detail is to make a sliding contact with and then engage a hook extension on the slide, this action retains for a moment the slide and releases the lock as the main carrier commences its return journey thus freeing the main cable for another operation.

In the drawings herewith, Fig. 1 shows a general view of the method of using my device in which the log is being first picked up ready for the "yarding" operation. Fig. 2 shows a similar view but with the log hauled to the main pole and lowered to the ground thus completing the operation as regards the log; the remaining figures show details of the gear employed in the operations and are described particularly later. $a$ is the main pole; $b$, the modified sky line; $c$, the back pole; $d$, the log; $e$, the main haulage cable; $f$, the swivel stop thereon; $g$, the cable-locking pulley block; $h$, the projecting hook thereon; $i$, the auxiliary pulley block carrying the weighted stirrup $j$, against which the hook $h$, engages and holds until released. $k$, is the double pulley block shown in detail in Fig. 10 and Fig. 11; this is suspended from the center $l$, and so makes an easier bend for the sky line $b$, where this cable drops to the foot of the main pole at $m$; $n$, and $o$, are the single pulleys which carry the sky line haulage cable $p$, the usual haul-back line is shown at $q$, and a slack-puller cable at $r$; The auxiliary block $i$, is suspended from the skyline $b$, at any desired point and there anchored to the block $k$, by the line $s$, the weighted stirrup $j$, is fulcrumed at $t$, one end of the lever being connected to a releasing line $u$; the projecting hook $h$, on the locking block is shown engaging the stirrup $j$, from which it can be disengaged by a jerk on the line $u$, when the main haulage gear returns for another log. Figures 5, 6, and 7, show in some detail the construction of the cable-locking block in which $v$, are the pulleys for the main haulage cable, $w$, those for the skyline on which the block travels $x$, is the triangular stop which is linked to the short attaching cable $y$, the latter being secured to the side of the block frame at $z$ and to the slide $a^1$ at $b^1$ within the block framing in the center below the slide are two pairs of friction rollers $c^1$; the hole $d^1$ is centrally in line with the main haulage cable $e$ and the swivel stop $f$ has been dropped to the position where it is shown in Fig. 1, the log is now ready for the actual "yarding" operation, and the block $g$ being held in location on the sky line by the haulback line $q$ can be hoisted vertically to any desired level so as to clear the ground obstructions when this point is reached the stop $f$ has passed through the slide $a^1$ and has contacted the triangular stop $x$ and carried the latter upwards so as to shorten the effective length of the short connecting cable $y$, thus jerking back the slide to the position limited by the stop and the spring catch $m^1$, where the cable is no longer in the hole $d^1$ but is in the slot $e^1$; thus the vertical motion of the cable and the log is effectively locked within a very short range, for the stops $f$ and $x$ in combination cannot pass the two pulleys above and the stop $f$ is intercepted by the slide $a^1$, moreover the latter is of massive proportions and is so engaged by the spring $m^1$ that it cannot be jolted out of position; it is further inherently secured by the stresses set up by the forces involved; when the log arrives at its destination near the main pole the sky line at that end may be dropped as shown.

To complete the operation when the projecting hook $h$ comes in contact with the looped stirrup $j$, the rebound causes the hook to engage and draw back the slide $a^1$, so that the stop $f$ may drop through the hole $d^1$, the log is then lowered to the ground, the cord $u$ is jerked and the hook $h$ released when the block $g$ is free to commence the operation again.

What I claim and desire to secure by Letters Patent, is:

A self locking sheave carrier having an upper and a lower pair of sheaves, the latter acting as a guide for the main haulage cable, a flat slide bar located below said pulleys and capable of a horizontal sliding movement, said slide being threaded by said haulage cable through a circular central hole having a narrowed slotted extension, and said slide being connected with said carrier by a cable in two parts linked together by a triangular stop perforated for threading on said haulage cable, said haulage cable to be intercepted by and at a heavy swivel located on the lower side of said triangular threaded stop, the said slide bar terminating at one end in a special hook extension having an inclined surface for suitable impingement against a looped stirrup, the longitudinal movement of said slide bar to be limited by a spring catch and stops.

MATHIAS HEMMINGSEN.